Jan. 7, 1947.    J. L. DECKER    2,413,813
DEVICE FOR SUPPORTING GARDEN HOSE
Filed June 26, 1944

INVENTOR
James L. Decker
BY
ATTORNEY

Patented Jan. 7, 1947

2,413,813

UNITED STATES PATENT OFFICE 2,413,813

DEVICE FOR SUPPORTING GARDEN HOSE

James L. Decker, Beverly Hills, Calif.

Application June 26, 1944, Serial No. 542,036

4 Claims. (Cl. 248—87)

This invention has to do with devices for supporting hose and it is among the objects of the invention to provide a simple and economical device for supporting garden hose in position connected to the water supply and in position conveniently available for use.

It is also among the objects of my invention to provide a device of this character which affords protection for flower beds and the like from injury by the supported hose.

Hereofore the conventional means for retaining a hose in convenient position for use has been the well-known hose reel, which is relatively complicated and expensive and at the same time fails to support the hose in elevated position during use in such a manner as to protect flower beds and the like from injury due to dragging the hose over the ground surface.

Additional objects and advantages are inherent in my invention and those will become apparent from the following detailed explanation of a presently preferred embodiment. I wish it understood that the invention, in its broader aspects as defined by the accompanying claims, is not to be confined to the details of structure now to be described, since it is capable of being carried out in other and modified physical forms.

For purposes of the following description of a preferred example of my invention, I shall refer to the accompanying drawing, in which:

Fig. 7 is a fragmentary view partly in section of still another modified form of my invention.

Figure 1:
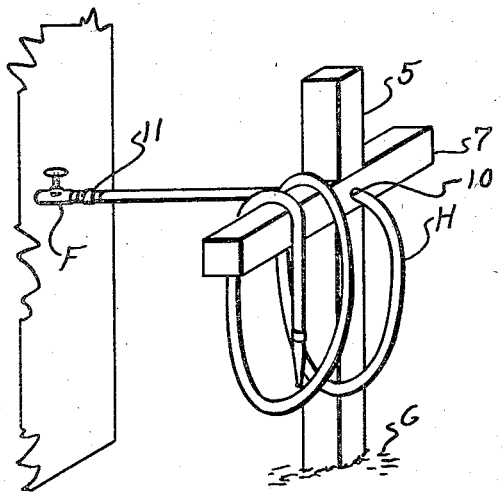
Fig. 1 is a perspective showing my device in position supporting a hose.
Figure 4:
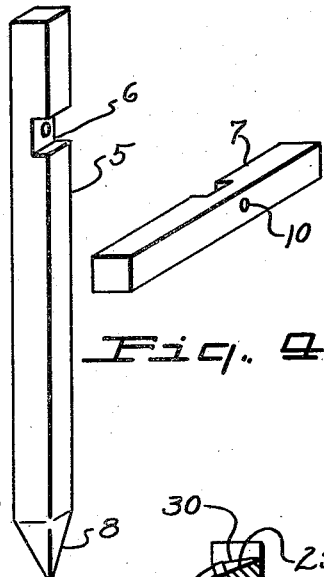
Fig. 4 is a perspective showing the parts in disassembled position.
Figure 3:
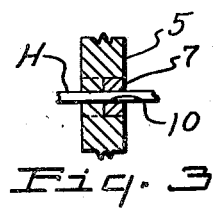
Fig. 3 is a fragmentary section.
Figure 2:
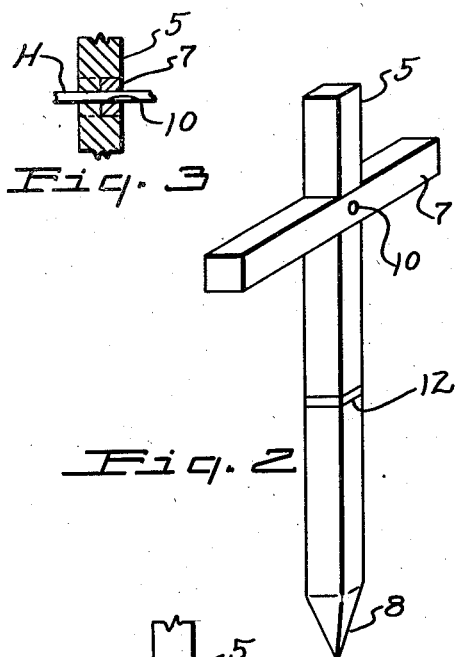
Fig. 2 is a perspective of the device.

Referring to the drawing, I show an embodiment comprising a post or upright 5 morticed at 6 for the reception of a correspondingly morticed hose-retaining cross arm 7. The post 5 has a pointed lower end 8 to facilitate its being driven in the ground G sufficiently to rigidly support it in upright position. In some cases it may be preferable to embed the lower end portion of the post in concrete.

An opening 10 is provided transversely through the post and cross arm at their point of intersection, which opening is large enough in diameter to freely pass a garden hose H, and is preferably of rounded cross section so as not to present any sharp corners.

In practice, the post 5 is positioned somewhat adjacent the water supply faucet F so that after being passed through the opening 10 the inlet end of the hose may be connected to the faucet and may remain so connected. The discharge end of the hose being on the opposite side of the post is free for use.

As best shown in perspective in Fig. 1, a garden hose is amply supported above the ground G in which ground, for example, there may be a flower bed which would be damaged if the hose were dragged over or allowed to rest thereon. By virtue of being supported above the bed, however, no such injury can result when my device is used.

When the hose is not in use it need not be disconnected from the water supply, but its free end may be readily looped above either of the three arms of the support. Preferably it is wound about the cross arm at one side of the post, as shown in Fig. 1, so that to use the hose it is only necessary to pull on the free end and it will readily slip off the arm and become unlooped without becoming knotted and without dragging over the surface of the ground. The coupling member 11, by which the hose is connected to the faucet, is thus protected from the various stresses which would normally result in damage and leakage at the point of connection.

I may provide guide indicia 12 on the post 5 to indicate the desirable depth to which the post should be driven in the ground or embedded in concrete as the case may be.

Figure 5:
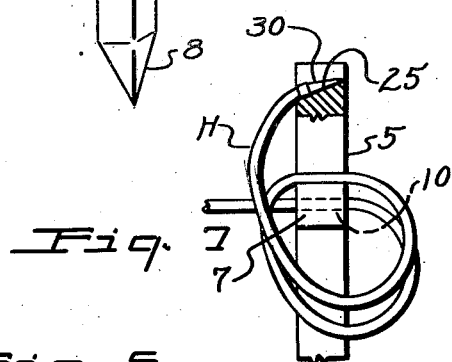
Fig. 5 is a fragmentary view showing a variational form of the device.
Figure 8:
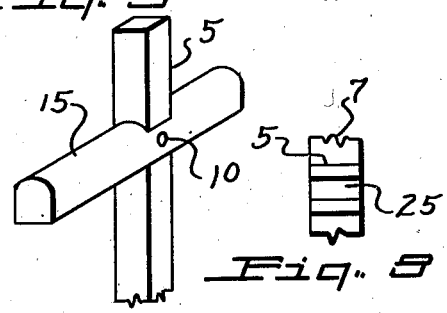
Fig. 8 is a top plan view showing the top end of the post of Fig. 7.

In Fig. 5 I show a modified form of device which is as before described except that the top surface of the cross arm is rounded as shown at 15, so that it does not present any sharp edges to damage the hose supported thereon.

Figure 6:
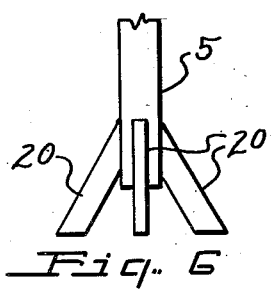
Fig. 6 is a fragmentary perspective of another form of modified device.

In Fig. 6 I show a further variational form of device which is as before described except that here the post 5, instead of being pointed at its lower end for the purpose of being driven into the ground, has supporting legs 20 secured thereto and disposed at an angle therefrom.

In Fig. 7 I show a further modification which is as before described except that here the post 5 has a recess 25 in its top end, whose bottom wall is disposed at an angle and which recess is shaped to retain a hose nozzle 30 carried by the hose H. By this structure, if it is desired to spray a given area for a considerable length of time, the hose may be looped about the arm 7 in the manner before described and the nozzle positioned in the recess 25 where it will be retained in spraying position, the remainder of the hose being supported above the ground.

I claim:

1. A device of the class described comprising a post, means for supporting the post in upright position, an arm carried by the post adjacent its top end, said arm being disposed at an angle to the post, a hose-receiving opening transversely through the post adjacent its top end and a hose mounted between its ends in said opening.

2. A device of the character described for supporting a garden hose in position connected to a water supply and spaced above the ground, comprising a post, means for supporting the post in upright position, a hose-supporting arm secured to and disposed angular to the post adjacent its top end and a hose-passing hole disposed through the post adjacent its top end.

3. A device of the character described for supporting a garden hose in position connected to a water supply and spaced above the ground, comprising a post, means for supporting the post in upright position, a hose-supporting cross arm carried by the upper end portion of the post, and a hose-passing opening disposed transversely through the post and cross arm at their point of intersection.

4. A device of the character described for supporting a garden hose in position connected to a water supply and spaced above the ground, comprising a post, means for supporting the post in upright position, a hose-supporting arm secured to and disposed angular to the post adjacent its top end, a hose-passing hole disposed through the post adjacent its top end, and a nozzle-retaining recess in the top end of the post.

JAMES L. DECKER.